US011178022B2

(12) United States Patent
Ranchal et al.

(10) Patent No.: US 11,178,022 B2
(45) Date of Patent: Nov. 16, 2021

(54) EVIDENCE MINING FOR COMPLIANCE MANAGEMENT

(71) Applicant: International Business Machines Corporation, Armonk, NY (US)

(72) Inventors: Rohit Ranchal, Cambridge, MA (US); Uttam Thakore, Urbana, IL (US); HariGovind Venkatraj Ramasamy, Round Rock, TX (US); Yi-hsiu Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 16/584,054

(22) Filed: Sep. 26, 2019

(65) Prior Publication Data

US 2021/0096974 A1    Apr. 1, 2021

(51) Int. Cl.
| | |
|---|---|
| *H04L 12/24* | (2006.01) |
| *G06F 11/30* | (2006.01) |
| *G06F 16/23* | (2019.01) |
| *G06N 20/00* | (2019.01) |
| *G06K 9/62* | (2006.01) |
| *G06F 16/2455* | (2019.01) |

(52) U.S. Cl.
CPC .......... *H04L 41/50* (2013.01); *G06F 11/3072* (2013.01); *G06F 16/2358* (2019.01); *G06F 16/24564* (2019.01); *G06K 9/6256* (2013.01); *G06N 20/00* (2019.01); *H04L 41/16* (2013.01)

(58) Field of Classification Search
CPC ....... H04L 41/50; H04L 41/16; G06K 9/6256; G06F 11/3072; G06F 16/2358; G06F 16/24564; G06N 20/00; G06Q 30/018
See application file for complete search history.

(56) References Cited

U.S. PATENT DOCUMENTS

| | | |
|---|---|---|
| 7,716,135 B2 | 5/2010 | Angell |
| 7,734,606 B2 | 6/2010 | Walker |

(Continued)

OTHER PUBLICATIONS

Yuan, Yue, Anuhan Torgonshar, Wenchang Shi, Bin Liang, Bo Qin, "Digging Evidence for Violation of Cloud Security Compliance with Knowledge Learned from Logs", Springer Nature Singapore, pp. 318-337, First Online: Jan. 9, 2019 (Year: 2019).*

(Continued)

*Primary Examiner* — Nam T Tran
(74) *Attorney, Agent, or Firm* — Yee & Associates, P.C.

(57) ABSTRACT

A method, apparatus, system, and computer program product for facilitating evidence collection. A set of evidence requirements is identified by computer system in which the set of evidence requirements is for a control that manages a set of resources in the computer system to enforce a policy in the computer system. Labels are associated by the computer system with historical evidence for the set of requirements. The historical evidence comprises prior evidence collected for compliance with the set of evidence requirements for the control and was accepted to meet the set of evidence requirements for the control. The historical evidence with the labels form labeled historical evidence. Rules for mining evidence for the set of evidence requirements for the control using the labeled historical evidence are learned by a machine learning model in the computer system.

20 Claims, 7 Drawing Sheets

(56) References Cited

U.S. PATENT DOCUMENTS

| | | | |
|---|---|---|---|
| 9,250,884 B2 | 2/2016 | Ravi | |
| 9,382,747 B1 | 7/2016 | Anderson et al. | |
| 9,967,285 B1* | 5/2018 | Rossman | G06F 16/22 |
| 10,055,249 B2 | 8/2018 | Betzler et al. | |
| 10,192,356 B2 | 1/2019 | Brandts et al. | |
| 10,255,370 B2 | 4/2019 | Carpenter et al. | |
| 2012/0102543 A1* | 4/2012 | Kohli | H04L 63/20 726/1 |
| 2013/0247136 A1 | 9/2013 | Chieu et al. | |
| 2016/0267396 A1* | 9/2016 | Gray | G06N 20/00 |
| 2018/0025071 A1* | 1/2018 | Ideses | G06N 20/00 707/738 |
| 2018/0367407 A1 | 12/2018 | Anandam et al. | |
| 2020/0082299 A1* | 3/2020 | Vasconcelos | G06N 20/00 |
| 2020/0175076 A1* | 6/2020 | Powers | G06N 20/00 |
| 2021/0004949 A1* | 1/2021 | Broyda | G06N 20/00 |

OTHER PUBLICATIONS

Mell et al., "The NIST Definition of Cloud Computing," National Institute of Standards and Technology, U.S. Department of Commerce, NIST Special Publication 800-145, Sep. 2011, 7 pages.

Agarwal et al., "Cognitive Compliance for Financial Regulations," IT Pro, Jul./Aug. 2017, pp. 28-35.

"Artificial Intelligence, Real Breakthroughs: The Practice and Promise of AI In Auditing," Forbes Insights, Oct. 19, 2018, 4 pages.

Boillet, "How artificial intelligence will transform the audit," EY Reporting, Jul. 2018, 5 pages.

Bowling, "How we successfully implemented AI in audit," Journal of Accountancy, Jun. 1, 2019, 3 pages.

Zhu et al., "Tools and Benchmarks for Automated Log Parsing," Nov. 8, 2018, 18 pages.

* cited by examiner

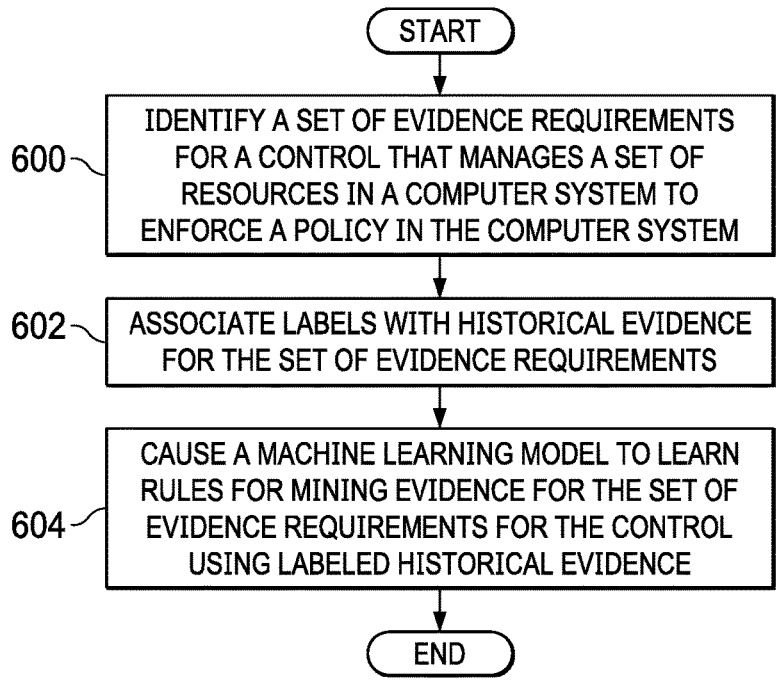
FIG. 6
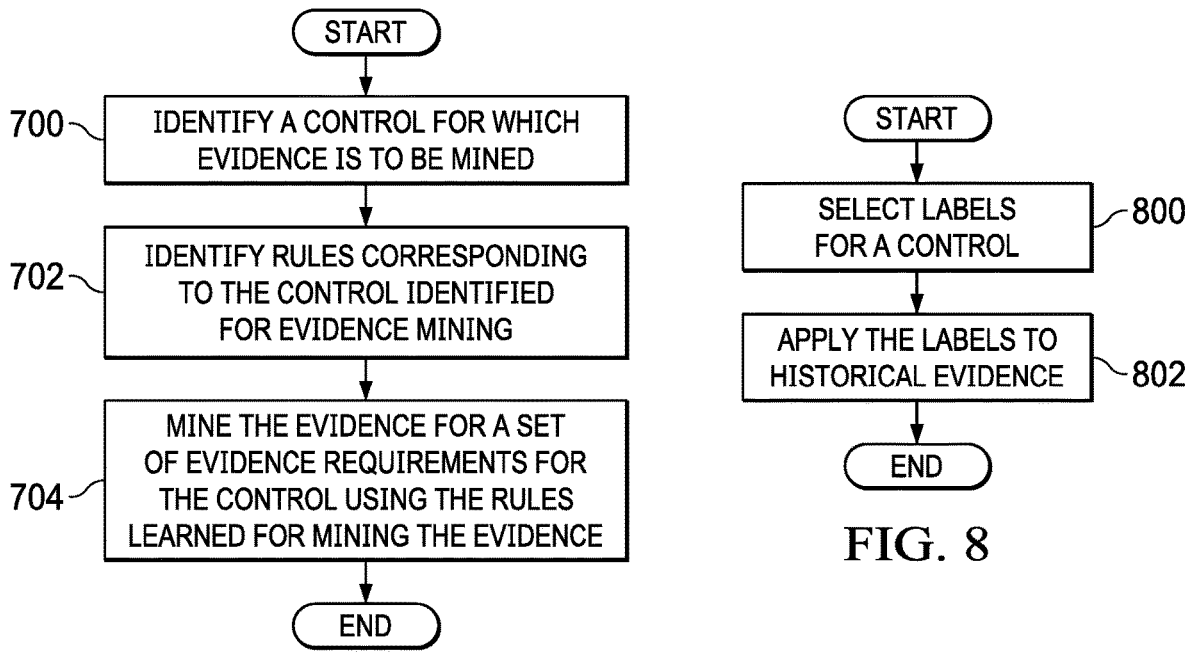
FIG. 7
FIG. 8

EVIDENCE MINING FOR COMPLIANCE MANAGEMENT

BACKGROUND

1. Field

The disclosure relates generally to an improved computer system and, more specifically, to a method, apparatus, system, and computer program product for collecting evidence in a computer system for compliance management.

2. Description of the Related Art

Cloud computing is an Internet-based computing architecture in which different services such as servers, storage, applications, and other services are delivered to computers and devices for users through the Internet. Cloud computing allows computing resources to be accessed and shared as virtual resources in a secure and scalable manner. The cloud provides increased efficiency, data space, scalability, speed, and other benefits.

Cloud computing services offered to users include security, data transfer, data protection, data encryption, configuration management, storage, and other services. Often times, the cloud computing services are described as meeting one or more standards. Providers of cloud computing services go through various regulatory, regional, and industrial certifications. The certification and renewal of certifications involve audits of controls that implement requirements of the standards for which certifications are sought and renewed.

With the size of the cloud environment and the numerous controls that are used to satisfy various certifications, auditing providers of cloud computing services or compliance to the standards involves large-scale evidence collection and validation from a variety of sources. The sources include, for example, log management systems, security information and event management (SIEM) systems, code management systems, access management systems, ticketing systems, policy documents, and other sources. Identifying the correct evidence for a given system to satisfy that a control in a cloud computer service meets the requirements for a particular standard involves a large amount of effort and resources. The overhead for gathering evidence for audits of controls is multiplied with the number of certifications, number of controls per certification, and number of different systems that are evaluated in a cloud computing environment.

SUMMARY

According to one embodiment of the present invention, a method facilitates evidence collection. A set of evidence requirements is identified by a computer system in which the set of evidence requirements is for a control that manages a set of resources in the computer system to enforce a policy in the computer system. Labels are associated by the computer system with historical evidence for the set of requirements. The historical evidence comprises prior evidence collected for compliance with the set of evidence requirements for the control and was accepted to meet the set of evidence requirements for the control. The historical evidence with the labels form labeled historical evidence. Rules for mining evidence for the set of evidence requirements for the control using the labeled historical evidence are learned by a machine learning model in the computer system.

According to another embodiment of the present invention, an evidence mining system comprises a computer system. The computer system identifies a set of evidence requirements for a control a control that manages a set of resources in the computer system to enforce a policy in the computer system. The computer system associates labels with historical evidence for the set of requirements. The historical evidence comprises prior evidence collected for compliance with the set of evidence requirements for the control and was acceptable evidence to meet the set of evidence requirements for the control. The historical evidence with the labels form labeled historical evidence. A machine learning model in computer system learns rules for mining evidence for the set of evidence requirements for the control using the labeled historical evidence.

According to yet another embodiment of the present invention, a computer program product for facilitating evidence collection comprises a computer-readable-storage media with first program code, second program code, and third program code, stored on the computer-readable storage media. First program code is executed to identify a set of evidence requirements for a control that manages a set of resources in a computer system to enforce a policy in the computer system. Second program code is executed to associate labels with historical evidence for the set of requirements. The historical evidence comprises prior evidence collected for compliance with the set of evidence requirements for the control and was acceptable evidence to meet the set of evidence requirements for the control. The historical evidence with the labels form labeled historical evidence. Third program code is executed to cause a machine learning model in the computer system to learn rules for mining evidence for the set of evidence requirements for the control using the labeled historical evidence.

BRIEF DESCRIPTION OF THE DRAWINGS

FIG. 6 is a flowchart of a process for facilitating evidence collection in accordance with an illustrative embodiment;

FIG. 7 is a flowchart of a process for facilitating evidence collection in accordance with an illustrative embodiment;

FIG. 8 is a flowchart of labeling historical evidence in accordance with an illustrative embodiment.

DETAILED DESCRIPTION

Figure 1:
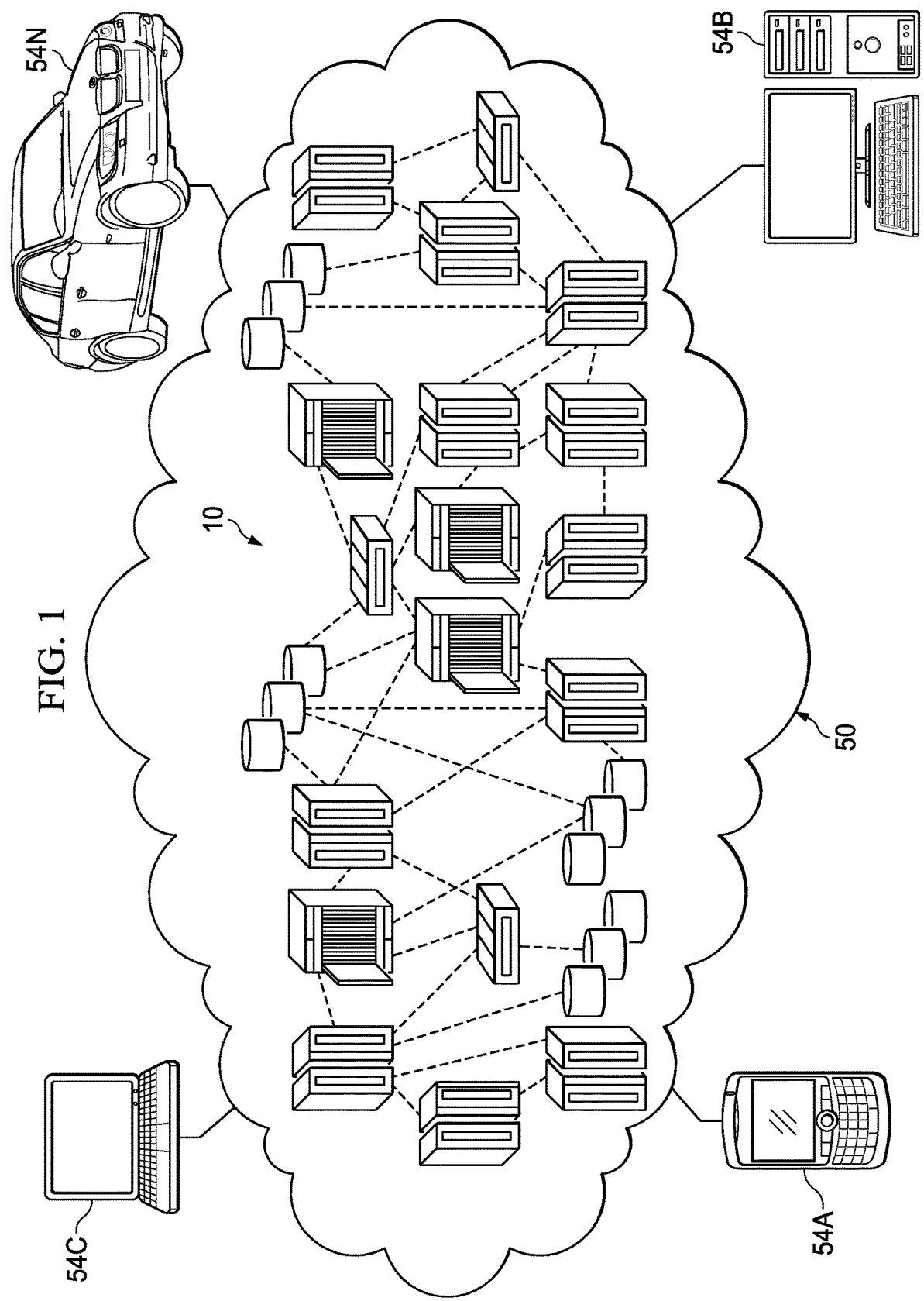
FIG. 1 is a cloud computing environment in accordance with an illustrative embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, with a scale of evidence, a variety of certifications, and controls that are used to implement standards, the illustrative embodiments recognize and take into account that it is difficult to develop and maintain conventional algorithms for effectively collecting and validating the evidence used to certify that controls meet the requirements on a standard. The illustrative embodiments recognize and take into account that cloud computing systems can receive new updates, can be upgraded to newer versions, and can change in size and complexity over time, resulting in changes to evidence structure, format, or both the evidence structure and the format. Further, the illustrative embodiments recognize and take into account that standards can be updated and new standards can be introduced. The illustrative embodiments also recognize and take into account that changes can occur in certification processes and new certifications can cause changes to audits.

The illustrative embodiments recognize and take into account that these and other factors can make obtaining and renewing certifications more difficult and complex than desired. The illustrative embodiments recognize and take into account that collecting evidence to obtain certifications and periodically renew certifications requires a lot of effort. The illustrative embodiments recognize and take into account that multiple certifications can result in a duplication of work and add enormous overhead. The illustrative embodiments recognize and take into account that this increased overhead can result in increased expenses, delayed certifications, penalties, non-compliance, and security exposure.

Thus, the illustrative embodiments provide a method, apparatus, system, and computer program product for collecting evidence. This evidence is collected for an audit process to determine whether a control implemented for a standard meets the requirements for a policy, which can include at least one of a standard, a regulation, or some other source of rules or requirements.

In one illustrative example, a method facilitates evidence collection. A set of evidence requirements is identified by a computer system in which the set of evidence requirements is for a control that manages a set of resources in the computer system to enforce a policy in the computer system. Labels are associated by the computer system with historical evidence for the set of requirements. The historical evidence comprises prior evidence collected for compliance with the set of evidence requirements for the control and was accepted to meet the set of evidence requirements for the control. The historical evidence with the labels form labeled historical evidence. Rules for mining evidence for the set of evidence requirements for the control using the labeled historical evidence are learned by a machine learning model in the computer system.

As used herein, "a set of," when used with reference to items, means one or more items. For example, "a set of evidence requirements" is one or more evidence requirements.

An audit process has a number of stages. These stages include initial evidence gathering, audit interview, and remediation. Each stage can involve gathering data that is used to determine whether controls in a cloud computing service meet a standard for which an audit is being performed. Currently, gathering evidence for audits is a time-consuming process.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, an illustration of cloud computing environment 50 is depicted in accordance with an illustrative embodiment. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
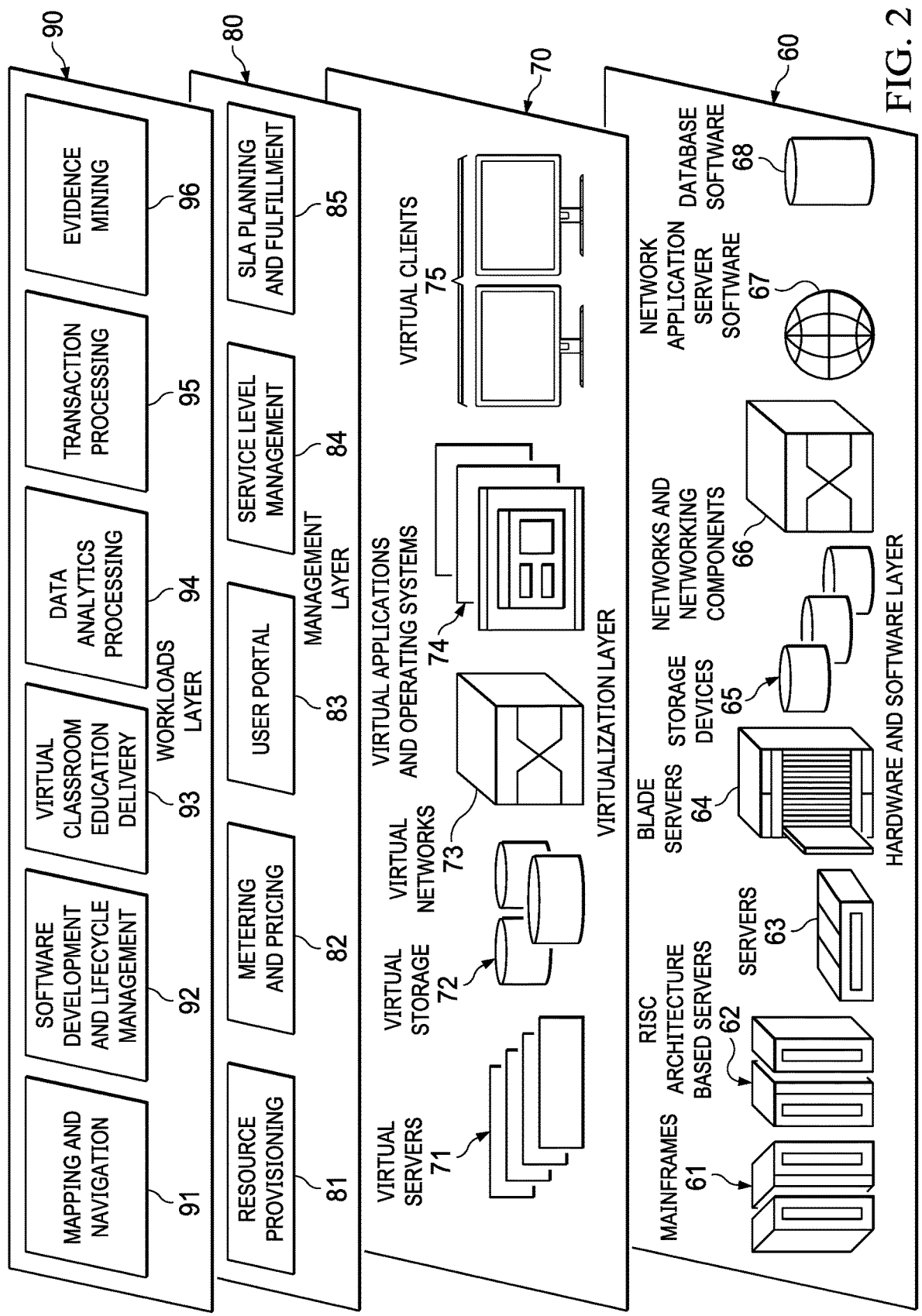
FIG. 2 is abstraction model layers in accordance with an illustrative embodiment.

Referring now to FIG. 2, a set of functional abstraction layers provided by cloud computing environment 50 (FIG. 1) is shown in accordance with an illustrative embodiment. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evidence mining 96.

In this illustrative example, evidence mining 96 is a functionality that provides for security and compliance auditing for enterprises such as those that are cloud service providers. In the illustrative example, evidence mining 96 optimizes evidence collection and validation to increase the efficiency and compliance management. Further, evidence mining 96 can enable continuous compliance and ensure audit certification readiness for an enterprise or other organization. In this illustrative example, evidence mining 96 can operate to facilitate evidence collection for determining whether a set of controls meet requirements set by a policy.

Figure 3:
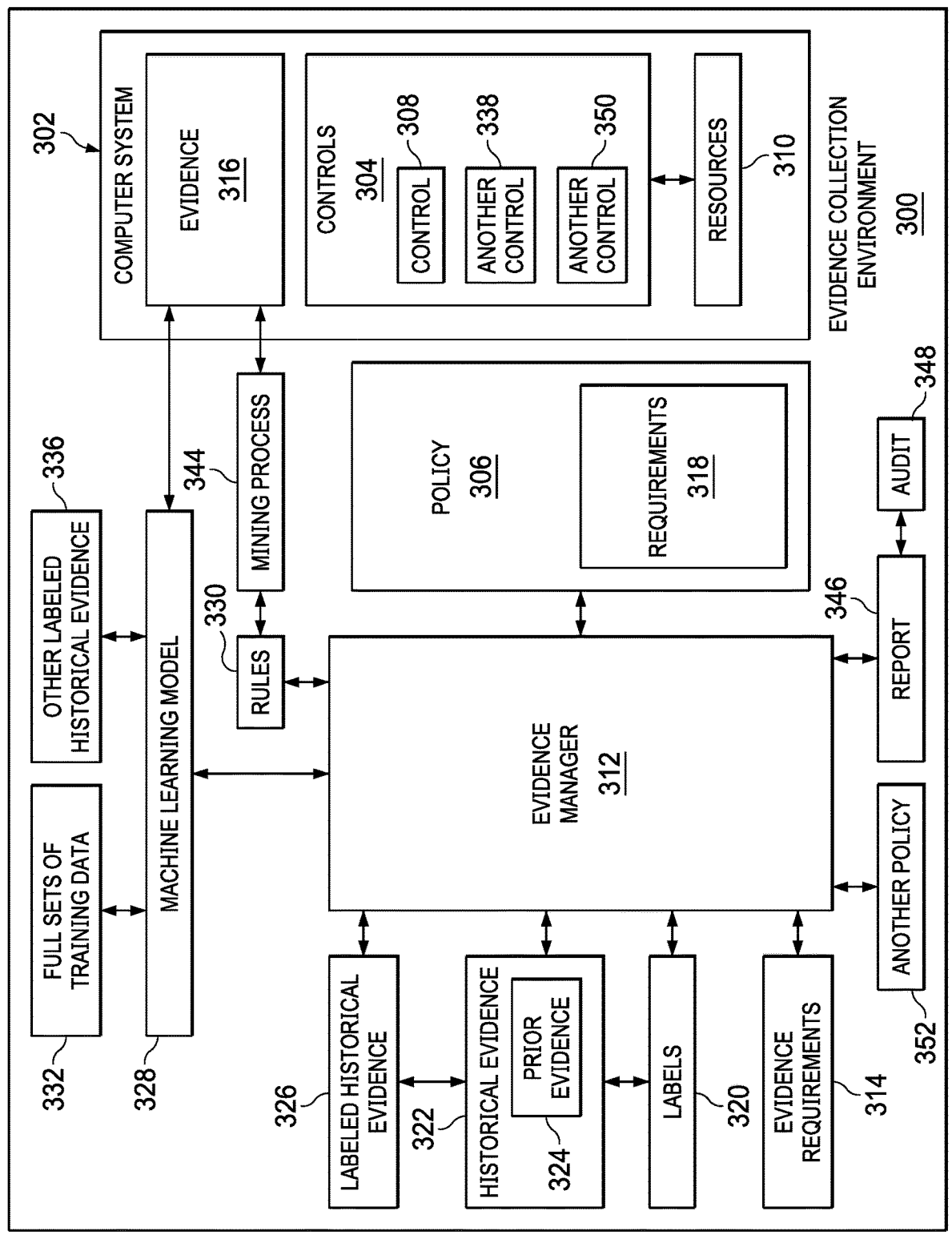
FIG. 3 is a block diagram of an evidence collection environment in accordance with an illustrative embodiment.

With reference now to FIG. 3, a block diagram of an evidence collection environment is depicted in accordance with an illustrative embodiment. In this illustrative example, evidence collection environment 300 includes components that can be implemented in hardware such as the hardware shown in cloud computing environment 50 in FIG. 1 or in hardware and software layer 60 in FIG. 2.

In this illustrative example, computer system 302 is a system that includes controls 304. In this illustrative example, computer system 302 can be implemented as cloud computing environment 50 including cloud computing nodes 10 in FIG. 2. Additionally, computer system 302 can take other forms. For example, computer system 302 can be a network data processing system that includes a network which is the medium used to provide communications links between various devices and computers connected together within network data processing system. Computer system 302 can include at least one of the Internet, an intranet, a local area network (LAN), a metropolitan area network (MAN), a wide area network (WAN), or other suitable communications medium to facilitate communications between computers or other types of computing devices that may be part of or connected to computers system 302.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, controls 304 in computer system 302 are designed or configured using policy 306. Policy 306 comprises at least one of a standard, a regulation, a specification, or some other source that specifies at least one of what controls 304 are included in computer system 302 or how controls 304 operate in computer system 302 to enforce policy 306.

For example, control 308 in controls 304 in computer system 302 operates to manage a set of resources 310 in computer system 302 to enforce policy 306 in computer system 302.

In this illustrative example, the set of resources 310 can take a number of different forms. For example, the set of resources 310 can include at least one of a server computer, a switch, a router, a communications link, a storage system, a memory, a database, a firewall, an application, a cloud service, a processing resource, a virtual machine, network bandwidth, a network, a cloud, a community cloud, a public cloud, a hybrid cloud, a cloud computing node, a virtual storage, a virtual application, a virtual private network, a mainframe, a user portal, or resources in computer system 302.

Computer system 302 is a physical hardware system and includes one or more data processing systems. When more than one data processing system is present in computer system 302, those data processing systems are in communication with each other using a communications medium. The communications medium can be a network. The data processing systems can be selected from at least one of a computer, a server computer, a tablet computer, or some other suitable data processing system.

In this illustrative example, evidence manager 312 can operate to facilitate evidence collection in computer system 302. Evidence manager 312 can be implemented in software, hardware, firmware, or a combination thereof. When software is used, the operations performed by evidence manager 312 can be implemented in program code configured to run on hardware, such as a processor unit. When firmware is used, the operations performed by evidence manager 312 can be implemented in program code and data and stored in persistent memory to run on a processor unit. When hardware is employed, the hardware may include circuits that operate to perform the operations in evidence manager 312.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In managing evidence collection, evidence manager 312 in computer system 302 identifies a set of evidence requirements 314 for control 308 that manages a set of resources 310 in computer system 302 to enforce policy 306 in computer system 302. As depicted, the set of evidence requirements 314 describes evidence 316 needed for showing or proving that control 308 is in compliance with policy 306. Evidence 316 can be used to determine whether a set of requirements 318 in policy 306 for control 308 are met. In other words, evidence requirements 314 are evidence 316 that is needed to show that requirements 318 in policy 306 have been met by control 308. Evidence requirements 314 can be set out in audit processes, audit reports, or other suitable sources.

The results of an audit can be used to determine whether a certification will be given or renewed for policy 306. In this example, policy 306 is a standard. The standard can be, for example, FedRAMP NIST SP 800-53, Cloud Security Alliance (CSA) STAR, ISO 2717, ISO 2718, SOC1, HIPAA, GDPR, ISO 9001, PCI DSS, or some other standard.

In the illustrative example, the set of requirements 318 is implemented in processes for control 308. Control 308 can operate to enforce the set of requirements 318 in computer system 302. For example, computer system 302 can host or include a cloud service for which control 308 is used to manage a set of resources 310 for the cloud service. Requirements 318 can also be referred to as rules.

As depicted, evidence manager 312 associates labels 320 with historical evidence 322 for the set of evidence requirements 314. In this illustrative example, historical evidence 322 comprises prior evidence 324 collected for compliance with the set of evidence requirements 314 for control 308 and was accepted to meet the set of evidence requirements 314 for control 308. For example, historical evidence 322 can comprise at least one of an audit report for control 308, a log, a configuration file, a document, a ticket, an alert, a notification, a system, a service, or a table in a database. As depicted, historical evidence 322 with labels 320 form labeled historical evidence 326.

In this illustrative example, labels 320 identify parts of evidence 316 that are relevant for a particular evidence requirement. In other words, a label in labels 320 can identify a piece of evidence that can be used to meet an evidence requirement to show that a control meets a particular requirement in a standard. As depicted, labels 320 can be identified in a number of different ways. For example, labels 320 can be extracted from prior audit reports, natural language processing techniques, control mappings, or other sources. Further, labels 320 can also be selected manually by a user depending on the particular implementation.

In this illustrative example, machine learning model 328 in computer system 302 can learn rules 330 that are needed for mining evidence 316. By learning rules 330, machine learning model 328 figures out or identifies rules 330 from training data such as labeled historical evidence 326. For example, machine learning model 328 can identify associations or relations between labels 320 and the sections associated with or tagged by labels 320 in labeled historical evidence 326 to learn rules 330.

Machine learning model 328 can learn using data input into machine learning model 328. Machine learning model 328 can learn using various types of learning algorithms. The learning algorithms include at least one of a supervised learning, an unsupervised learning, a feature learning, a weakly-supervised learning, a random forest, a sparse dictionary learning, an anomaly detection, association rules, or other types of learning algorithms. Examples of machine learning models that can be used for machine learning model 328 include an artificial neural network, a decision tree, a support vector machine, a Bayesian network, a genetic algorithm, and other types of models. These models can be trained using data and process additional data to provide a desired output.

As depicted, historical evidence 322 can be processed to extract features. For example, historical evidence 322 can comprise log files and configuration files. With this example, features that can be extracted from these files include at least one of a keyword, a configuration file, a syntax label, a topic label, a log line structure, or other suitable features. Labels 320 can be associated with these features extracted from historical evidence 322. Labels 320 with these features form labeled historical evidence 326 in this illustrative example.

In another illustrative example, labels 320 can be associated with particular parts of historical evidence 322 without processing historical evidence 322 to extract features. For example, labels 320 can be associated with parts of historical evidence 322 selected from at least one of a data structure, a document, a section of a file, a line in a document, a column in a table, a row in a table, or other pieces of information in historical evidence 322. The association of labels 320 with historical evidence 322 can be performed by at least one of a user, an artificial intelligence model, a machine learning model, or some other suitable mechanism that can associate labels 320 with historical evidence 322. The association can be made based on knowing which ones of evidence requirements 314 correspond to labels 320 by using existing mappings such as CCA CCM, or an auditor guideline document created by regulators or auditors (e.g., FedRAMP SAP), or by manually constructing a custom mapping or using natural language processing techniques applied to regulation/standard text (e.g., semantic modeling, text mining and topic modeling, or semantic analysis and clustering. Based on the relationship for mapping of evidence requirements 314 and labels 320, labels 320 can be associated with particular portions or parts of historical evidence 322.

As depicted, evidence manager 312 operates to cause machine learning model 328 in computer system 302 to learn rules 330 for mining evidence 316 for the set of evidence requirements 314 for control 308 using labeled historical evidence 326. In this illustrative example, labeled historical evidence 326 are positive training samples. In some examples, negative training samples can also be used.

In another illustrative example, a number of full sets of training data 332 from a number of historical audits can also be used as inputs to train machine learning model 328. As used herein, "a number of," when used in reference to items, means one or more items. For example, "a number of full sets of training data 332" is one or more of full sets of training data 332. A full set of training data is all of the sources of data that were available for learning rules for mining evidence 316 to find evidence 316 that can be used to meet evidence requirements 314 for control 308 in a prior audit for the same policy.

In the illustrative example, machine learning model 328 can learn rules 330 for mining evidence 316 for the set of evidence requirements 314 for control 308 using labeled historical evidence 326 and other labeled historical evidence 336 for another control 338 that has a same set of evidence requirements 314 for control 308. The set of evidence requirements 314 can be partially or completely the same for both control 308 and another control 338.

However, values for parameters can be different for the same evidence requirements for control 308 in different policies. For example, standard A and standard B can both have requirements for a control to handle lockouts of users. Standard A and standard B both have a requirement that locks out a user after a number of failed login attempts. The action in the requirement is to lockout a user. The parameter in this requirement is the duration after which a user is locked out.

For example, standard A locks out a user after three failed login attempts, and standard B locks out a user after five failed login attempts. The parameter for this requirement is a number of failed login attempts. The value for this parameter is three for standard A and five for standard B. The requirement is the same in both standards, but the value of the parameter is different. Thus, historical evidence 332 from audits involving requirements for controls from other policies can be used in training machine learning model 328 when those requirements are the same as requirements for controls 304 in policy 306.

After machine learning model 328 has learned rules 330, computer system 302 can mine evidence 316 for the set of evidence requirements 314 for control 308 using rules 330 learned for mining evidence 316. As depicted, the mining can be performed by at least one of mining process 344 using rules 330 learned for mining evidence 316, machine learning model 328 trained using labeled historical evidence 326, or some other suitable component.

In another illustrative example, mining evidence 316 for another set of evidence requirements 314 for another control 350 that enforces another policy 352 in computer system 302 that has a same set of evidence requirements 314 can be mined using rules 330 learned for mining evidence 316 for the set of evidence requirements 314 for control as specified by policy 306. In this manner, the learning of rules 330 can be performed for controls and other policies that have the same requirements. In other words, rules 330 can be applied to mining evidence 316 for other controls in other policies. As a result, training other machine learning models to generate rules for defining what evidence should be used as evidence requirements to meet requirements for those policies can be reduced or avoided by reusing rules 330 learned by machine learning model 328.

After mining has been performed, evidence manager 312 can generate report 346 for audit 348 using evidence 316 for the set of evidence requirements 314 for control 308. In this example, evidence 316 is mined using rules 330 learned for mining evidence 316.

Figure 4:
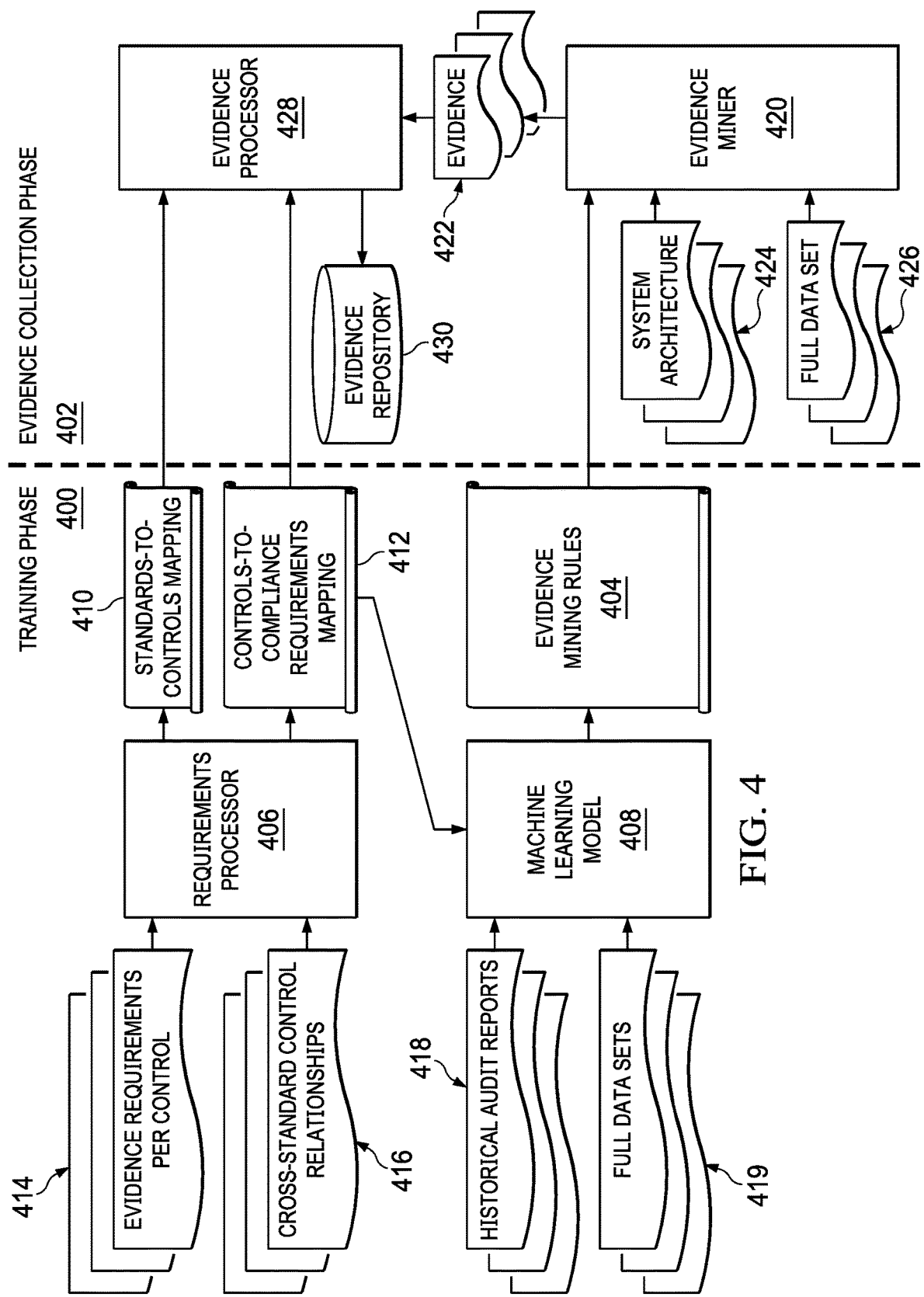
FIG. 4 is a diagram illustrating components and data flow for managing evidence collection in accordance with an illustrative embodiment.

With reference next to FIG. 4, a diagram illustrating components and data flow for managing evidence collection is depicted in accordance with an illustrative embodiment. In this illustrative example, the management of evidence collection can be performed in two phases. As depicted, training phase 400 and evidence collection phase 402 are present for managing the collection of evidence for use in various purposes such as audits to certify or re-certify controls in a computer system.

In training phase 400, evidence mining rules 404 are generated for use in mining during evidence collection phase 402. Evidence mining rules 404 are an example of rules 330 in FIG. 3. Evidence mining rules 404 are used to identify evidence for controls that are being evaluated as to whether the controls meet requirements for one or more standards.

As depicted, requirements processor 406 operates to identify mapping information for use in training machine learning model 408. Requirements processor 406 is an example of a component that can be implemented in evidence manager 312 in FIG. 3. As depicted, this information includes controls-to-compliance requirements mapping 412 and standards-to-controls mapping 410. Control-to-compliance requirements mapping 412 maps labels to each of the controls. The labels represent requirements in one or more standards. The labels are used to annotate historical evidence for use in training machine learning model 408. This mapping is defined using evidence requirements per control 414. Evidence requirements per control 414 describes evidence to show that each control is configured to operate as specified in a standard. Evidence requirements for control 414 can be obtained from existing guidelines provided by regulators or by mining the text in a standard. An example of an existing guideline is FedRAMP SAP, which is a template available from the United States government for use in their Federal Risk and Authorize Management Program (FedRAMP) providing a standardized approach to security assessment, authorization, and continuous monitoring for cloud products and services. FedRAMP controls can be described using NIST SP 800-53 control definitions as evidence requirements per control 414.

In this illustrative example, standards-to-controls mapping 410 identifies relationships between controls in different standards that have the same requirements. This mapping can be used to determine whether rules learned for one control in one standard can be used for another control in another standard.

In this illustrative example, standards-to-controls mapping 410 can be identified by requirements processor 406 using cross-standard control relationships 416. The relationships in cross-standard control relationships 416 identify controls that are considered the same across different standards. As depicted, the controls can be considered the same across standards if the control has the same requirements across the standards. In this illustrative example, cross-standard control relationships 416 can be obtained from existing mappings of standards. Cloud Controls Matrix from Cloud Security Alliance is an example of a mapping that can be used to identify common controls across different standards.

In this illustrative example, requirements processor 406 adds labels to historical audit reports 418 using controls-to-compliance requirements mapping 412. In this illustrative example, historical audit reports 418 are an example of historical evidence 322 in FIG. 3. Historical audit reports 418 are from prior audits that include a set of evidence, system architecture, and evidence acceptability labels. For example, a system security plan (SSP) for FedRAMP is an audit report that can be used as a historical audit. For example, historical audit reports 418 for FedRAMP can include an active directory configuration and invalid login attempt alerts. As another example, historical audit reports 418 can include a radius server configuration.

Historical audit reports 418 with the labels is an input to machine learning model 408. Another input for training machine learning model 408 is full data sets 419. Full data sets 419 are data sets from historical audits. Full data sets 419 include information such as base files from which evidence was extracted from prior audits.

As depicted, machine learning model 408 generates evidence mining rules 404 from processing historical audit reports 418 and full data sets 419. As depicted, evidence mining rules 404 define rules to extract evidence for a compliance requirement from a data source. The data source can be, for example, aggregated logs, configuration files, documents, or other information for the computer system that is to be audited.

After evidence mining rules 404 are generated by machine learning model 408, evidence can be mined in evidence collection phase 402 using evidence mining rules 404. Evidence miner 420 is an example of mining process 344 in FIG. 3. In this illustrative example, evidence miner 420 can be implemented as a script in a currently available automation tool, such as Chef InSpec, which is an open-source automated testing tool for integration, compliance, security, and other policy requirements.

As depicted, evidence miner 420 uses evidence mining rules 404 to collect evidence 422. In this illustrative example, evidence miner 420 obtains evidence 422 from system architecture 424 and full data set 426. System architecture 424 is a model of a computer system that is being audited. This model identifies system components and subsystems as well as the interaction between the systems. The systems can include hardware and software. Full data set 426 is all of the sources of data that are available for the audit.

In this illustrative example, evidence processor 428 receives evidence 422 from evidence miner 420. Evidence processor 428 is an example of a component that can be implemented in evidence manager 312 in FIG. 3.

Evidence processor 428 can place evidence 422 into a form for reporting for a particular standard. Further, evidence processor 428 can also include metadata with evidence 422 such as an identification of related controls, a timestamp for when evidence was collected, system components from which evidence was collected, and other suitable information. As depicted, evidence 422 can be used to generate a report such as report 346 in FIG. 3. Evidence 422 can be placed into a format for presentation by auditors for a particular standard.

The formatted evidence is stored in evidence repository 430 in this illustrative example. Further, evidence processor 428 also operates to manage evidence repository 430. Evidence processor 428 can retain only information needed for an ongoing audit as one manner in which evidence processor 428 can manage evidence repository 430.

For example, evidence requirements for a control may require proof of weekly log statements. In this case, requirements processor 406 can retain a single scan per week in evidence 422 stored in evidence repository 430.

In yet other illustrative examples, evidence processor 428 can include an additional capability for checking to see if evidence is missing from evidence repository 430 that is needed to meet evidence requirements for a particular control that is under audit. A notification or alert regarding missing evidence can be provided to an evidence manager, such as evidence manager 312 in FIG. 3, or a machine learning model.

In one illustrative example, one or more technical solutions are present that overcome a technical problem with collecting evidence for use in determining whether controls in a computer system comply with a standard. As a result, one or more technical solutions may provide a technical effect in which the machine learning model learns rules that enable mining a computer system for evidence that can meet evidence requirements for a control.

In one or more illustrative examples, evidence needed for audits to certify or re-certify a computer system for one or more standards can be automatically identified and mined. Further, as a computer system changes, a machine learning model can be retrained to learn rules that take into account the computer system changes. Computer system changes can include at least one of an upgrade to components, an addition of a new component, or some other change to a component. These components can be hardware or software.

Further, the machine learning model can also be retrained to take into account standards' changes or new standards.

In the illustrative examples, the machine learning model learns directly from historical evidence from prior audits. As depicted, a historical evidence is associated with labels that help identify prior evidence that was collected in compliance with a set of evidence requirements with a control in which the prior evidence was accepted as meeting the set of requirements for the control. The set of evidence requirements describes evidence needed for showing or proving that a control is in compliance with a policy. Further, the illustrative examples enable rules learned for mining evidence for controlling one standard to be applied to controls and other standards when requirements are the same between the standards.

Computer system 302 can be configured to perform at least one of the steps, operations, or actions described in the different illustrative examples using software, hardware, firmware, or a combination thereof. As a result, computer system 302 operates as a special purpose computer system in which evidence manager 312 in computer system 302 enables learning rules for mining evidence to meet evidence requirements for a control. In particular, evidence manager 312 transforms computer system 302 into a special purpose computer system as compared to currently available general computer systems that do not have evidence manager 312.

Figure 5:
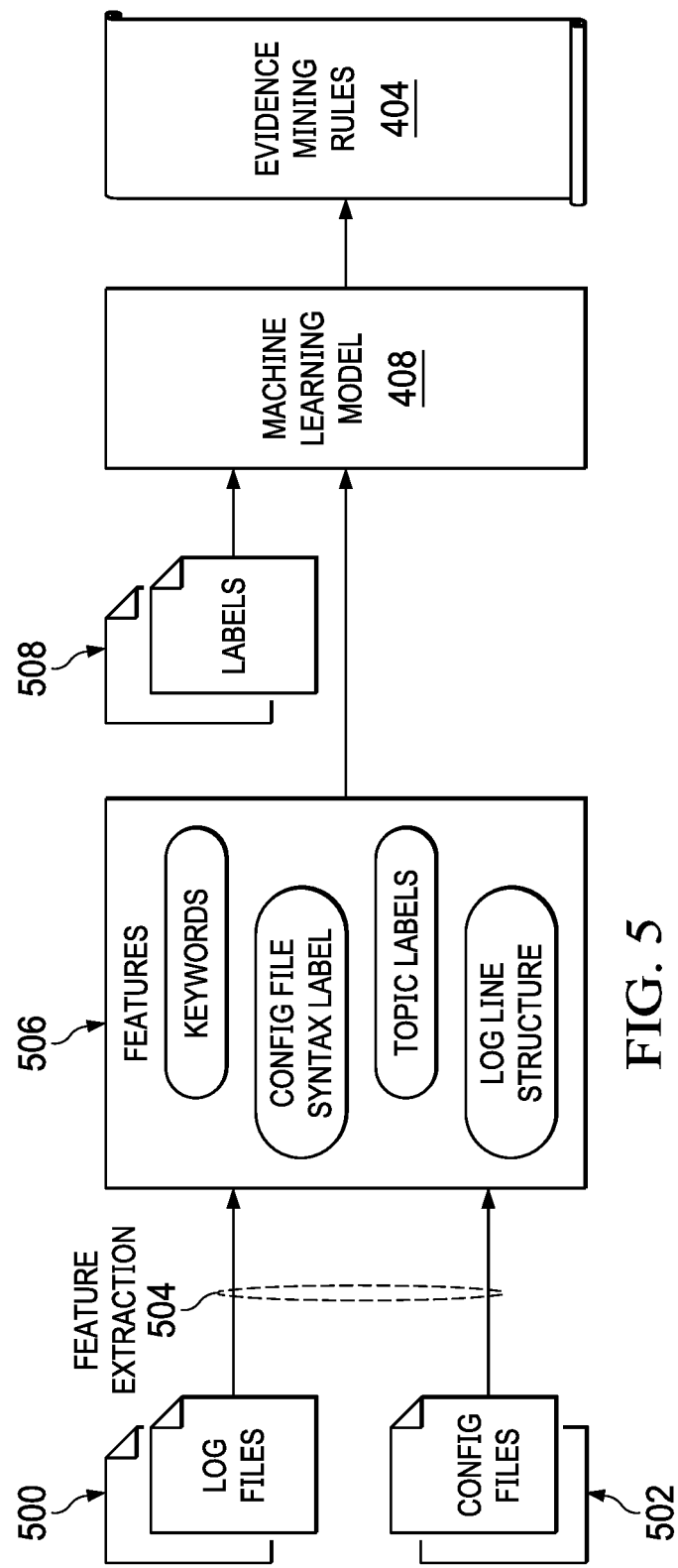
FIG. 5 is an example of data flow for learning rules for mining evidence in accordance with an illustrative embodiment.

With reference next to FIG. 5, an example of data flow for learning rules for mining evidence is depicted in accordance with an illustrative embodiment. In the illustrative examples, the same reference numeral may be used in more than one figure. This reuse of a reference numeral in different figures represents the same element in the different figures. The data flow in FIG. 5 can be used to learn evidence mining rules 404 in FIG. 4.

As depicted, log files 500 and config files 502 are examples of historical evidence that may be present in historical audit reports 418 in FIG. 4. This evidence from a previous audit is used as labels for what parts of the evidence are relevant for a particular requirement.

In this illustrative example, feature extraction 504 is performed on these files to identify features 506. Feature extraction 504 can be performed using at least one of a user input, natural language processing, or some other suitable mechanism.

As depicted, features 506 can include at least one of a keyword, a config file syntax label, a topic label, a log line structure, or some other feature. These features are the parts of the evidence needed to satisfy a particular requirement of a control.

In this illustrative example, features 506 are needed to understand input evidence data and are specific to the type of input evidence data. For example, features 506 of a log file include structure and format of the log file. As another example, features of a config file include the syntax of the file. Labels 508 can be used to identify which portions of the file are relevant for a requirement. In the illustrative example, both features 506 and labels 508 are used to create a rule that can be used to identify similar evidence from a computer system by understanding the data and then extracting the relevant portion of the data as the evidence mined using the rule.

As depicted, features 506 and labels 508 are inputs into machine learning model 408. Machine learning model 408 learns evidence mining rules 404 from these inputs. In the illustrative example, machine learning model 408 uses weakly-supervised learning to identify which combinations of features 506 extracted from log files 500 and config files 502 are predictive of use as evidence for learning evidence mining rules 404.

In the illustrative example, machine learning model 408 can be periodically retrained when changes are made to the computer system in which the control is used. For example, retraining can occur when a system component is added, removed, updated, or changed. Further, machine learning model 408 can be retrained after an audit using at least one of the audit report or evidence present or mined from the audit. This retraining can increase at least one of the speed or accuracy in which the evidence is mined for evidence requirements for a control.

The illustration of evidence collection environment 300 in FIGS. 3-5 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, evidence manager 312 can operate to train other machine learning models in addition to or in place of machine learning model 328 or machine learning model 408 to generate rules for other controls that may be specified by policy 306 or other policies. In the illustrative example, the process for generating machine learning models can be scaled based on the number of controls in different policies for which evidence is used to determine whether those controls meet requirements as specified in the policies. As a result, mining of evidence can be performed at the same time by many machine learning models for controls in policy 306. Further, evidence manager 312 can manage mining of evidence for multiple policies that may be implemented in computer system 302. Thus, a machine learning model can be trained for each control and each policy for which evidence is to be mined.

Additionally, evidence manager 312 can be located in computer system 302 even though evidence manager 312 is not depicted within computer system 302 in FIG. 3. In other illustrative examples, evidence manager 312 can be located in another computer system instead of computer system 302.

Turning next to FIG. 6, a flowchart of a process for facilitating evidence collection is depicted in accordance with an illustrative embodiment. The process in FIG. 6 can be implemented in hardware, software, or both. When implemented in software, the process can take the form of program code that is run by one of more processor units located in one or more hardware devices in one or more computer systems. For example, the process can be implemented in evidence manager 312 in computer system 302 in FIG. 3. This flowchart illustrates steps performed to identify rules for mining evidence that meets evidence requirements for a control under a policy.

The process begins by identifying a set of evidence requirements for a control that manages a set of resources in a computer system to enforce a policy in the computer system (step 600). The process associates labels with historical evidence for the set of evidence requirements (step 602). In step 602, the historical evidence comprises prior evidence collected for compliance with the set of evidence requirements for the control and was accepted to meet the set of evidence requirements for the control. The historical evidence with the labels form labeled historical evidence.

The process causes a machine learning model to learn rules for mining evidence for the set of evidence requirements for the control using labeled historical evidence (step 604). The process terminates thereafter. The process in FIG. 6 has been described with respect to a single control for a single policy. This process can be used for learning rules for any number of controls for any number of policies in a number of computer systems.

With reference to FIG. 7, a flowchart of a process for facilitating evidence collection is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in evidence manager 312 in computer system 302 in FIG. 3. The process illustrated in this figure illustrates steps performed to mine evidence using rules learned using the process illustrated by the flowchart in FIG. 6.

The process begins by identifying a control for which evidence is to be mined (step 700). In step 700, the control is one for which evidence is to be identified that meets evidence requirements to show that the control meets a policy. Each policy can have evidence requirements that spell out what evidence is needed to show that a control meets the policy.

The process identifies rules corresponding to the control identified for evidence mining (step 702). The process mines the evidence for a set of evidence requirements for the control using the rules learned for mining the evidence (step 704). The process terminates thereafter.

Turning next to FIG. 8, a flowchart of labeling historical evidence is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in evidence manager 312 in computer system 302 in FIG. 3. This flowchart illustrates steps performed to identify rules for mining evidence that meets evidence requirements for a control under a policy.

The process begins by selecting labels for a control (step 800). The process in step 800 can choose terms that include keywords or phrases in requirements for the control. The labels can be identified by at least one of a user input, a natural language processing technique, or some other suitable mechanism. The inputs used to identify the labels can be a predefined mapping of labels to a requirement, a predefined mapping of labels for evidence requirements in an audit report, a policy for the control, an auditor guideline, or some other suitable source of information.

In the illustrative example, the labels can be selected for a requirement or evidence requirement for showing that a control meets the requirements for that control in a particular policy. In other words, a label is associated with or maps to a requirement or evidence requirement for the control in the policy. For example, "lockout time" can be a label for a requirement in which a control locks out a user after some number of failed login attempts. This label can be mapped to the requirement in a table or some other data structure. These labels can be obtained from at least one of the policy for the control, a prior audit of the control, or some other suitable source. The process applies the labels to historical evidence (operation 802). The process terminates thereafter.

In this example, the process associates each label with the portion or portions of the historical evidence that provide evidence for determining whether the requirement associated with that label is met. The label highlights or marks relevant portions of the historical evidence for use in evaluating a requirement in a policy. The label can be applied to at least one of a file, a document, a portion of a file, a table, a set of columns in a table, a set of rows in a table, a set of lines, or some other piece of historical evidence.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 9:
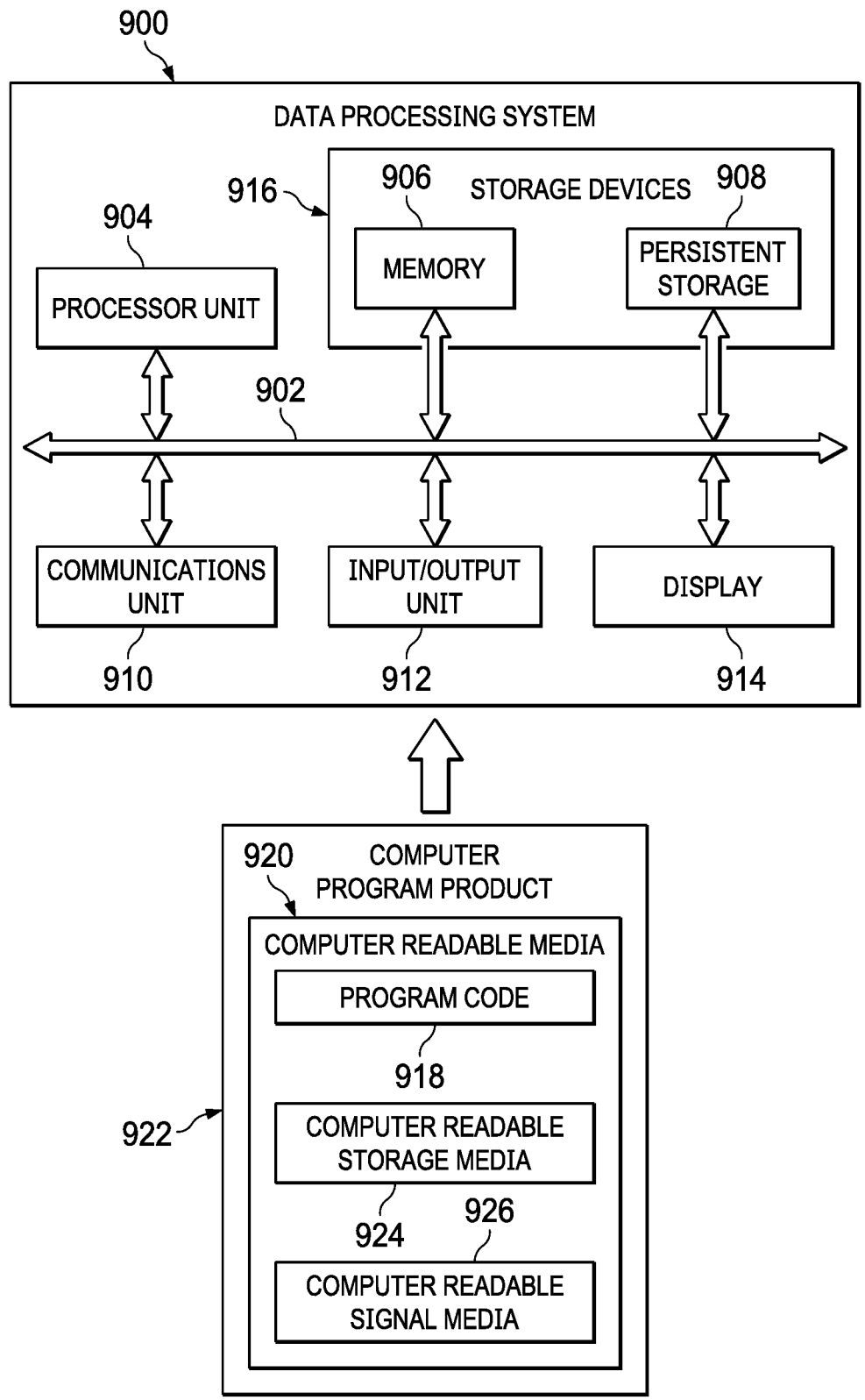
FIG. 9 is a block diagram of a data processing system in accordance with an illustrative embodiment.

Turning now to FIG. 9, a block diagram of a data processing system is depicted in accordance with an illustrative embodiment. Data processing system 900 can also be used to implement data processing system systems in the hardware shown in cloud computing environment 50 in FIG. 1 or data processing systems in hardware and software layer 60 in FIG. 2. Additionally, data processing system 900 can be used to implement computer system 302 in FIG. 3. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 904 can may be implemented using one or more heterogeneous processor systems in which a main processor is present with secondary processors on a single chip. As another illustrative example, processor unit 904 can be a symmetric multi-processor system containing multiple processors of the same type on a single chip.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Thus, the illustrative embodiments of the present invention provide a computer implemented method, computer system, and computer program product for facilitating evidence collection. A set of evidence requirements is identified by a computer system in which the set of evidence requirements is for a control that manages a set of resources in the computer system to enforce a policy in the computer system. Labels are associated by the computer system with historical evidence for the set of requirements. The historical evidence comprises prior evidence collected for compliance with the set of evidence requirements for the control and was accepted to meet the set of evidence requirements for the control. The historical evidence with the labels form labeled historical evidence. Rules for mining evidence for the set of evidence requirements for the control using the labeled historical evidence are learned by a machine learning model in the computer system.

Thus, the illustrative example can use historical evidence from a set of prior audits to train a machine learning model to mine evidence that meets evidence requirements to show that a control meets requirements for the control as specified in a policy. The machine learning model can be used to drive automated evidence mining in future audits. In one illustrative example, rule learning is performed to identify the context of what data is needed for an audit for whether a control meets the requirements of a policy. Additionally, the machine learning model in the illustrative example can learn rules from the historical audits. In the illustrative example, the rules learned about relationships between evidence and the evidence requirements to show that a control meets requirements for a policy can be applied to other policies.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for facilitating evidence collection, the method comprising:
   identifying, by a computer system, a set of evidence requirements for a number of controls that manage a set of resources in the computer system to enforce a policy in the computer system;
   associating, by the computer system, labels with historical evidence for the set of evidence requirements, wherein the historical evidence comprises prior evidence collected for compliance with the set of evidence requirements for the controls and was accepted to meet the set of evidence requirements for the controls, wherein the labels represent requirements of the policy, and wherein the historical evidence with the labels form labeled historical evidence;
   mapping, by the computer system, the labels to the controls based on the evidence requirements for the controls;
   mapping, by the computer system, standards to the controls according to relationships between controls in different standards that have the same requirements;
   generating a number of machine learning models in the computer system, wherein the number of machine learning models is scaled based on the number of controls in different policies for which evidence is used to determine whether the controls meet requirements of the policies;
   learning, by the number of machine learning models in the computer system, rules for mining evidence for the set of evidence requirements for the controls using the labeled historical evidence; and
   mining, by the number of machine learning models at the same time, the evidence for the set of evidence requirements for the controls according to the rules learned for mining the evidence.

2. The method of claim 1 further comprising:
   generating, by the computer system, a report for an audit using the evidence for the set of evidence requirements for the controls in which the evidence is mined using the rules learned for mining the evidence.

3. The method of claim 1, wherein the mining is performed by at least one of a mining process using the rules learned for mining the evidence or the machine learning model trained using the labeled historical evidence.

4. The method of claim 1 further comprising:
   mining, by the computer system, the evidence for another set of evidence requirements for another control that enforces another policy in the computer system that has a same set of evidence requirements using the rules learned for mining evidence for the set of evidence requirements for the controls.

5. The method of claim 1, wherein learning, by the number of machine learning models in the computer system, rules for mining the evidence for the set of evidence requirements for the controls using the labeled historical evidence comprises:
   learning, by the number of machine learning models in the computer system, rules for mining the evidence for the set of evidence requirements for the controls using the labeled historical evidence and a number of full data sets from a number of historical audits.

6. The method of claim 1, wherein learning, by the number of machine learning models in the computer system, rules for mining the evidence for the set of evidence requirements for the controls using the labeled historical evidence comprises:
   learning, by the number of machine learning models in the computer system, the rules for mining the evidence for the set of evidence requirements for the controls using the labeled historical evidence and other labeled historical evidence for another set of evidence requirements for another control that has a same set of evidence requirements for the controls.

7. The method of claim 1, wherein the historical evidence comprises at least one of an audit report for the control, a log, a configuration file, a document, a ticket, an alert, a notification, a table in a database.

8. The method of claim 1, wherein the labels are identified by at least one of a user input or a natural language processing technique.

9. An evidence mining system comprising:
   a computer system, comprising a processor and a memory storing program instructions executable by the processor whereby the computer system:
   identifying, by a computer system, a set of evidence requirements for a number of controls that manage a set of resources in the computer system to enforce a policy in the computer system;
   associating, by the computer system, labels with historical evidence for the set of evidence requirements, wherein the historical evidence comprises prior evidence collected for compliance with the set of evidence requirements for the controls and was accepted to meet the set of evidence requirements for the controls, wherein the labels represent requirements of the policy, and wherein the historical evidence with the labels form labeled historical evidence;
   mapping, by the computer system, the labels to the controls based on the evidence requirements for the controls;
   mapping, by the computer system, standards to the controls according to relationships between controls in different standards that have the same requirements;
   generating a number of machine learning models in the computer system, wherein the number of machine learning models is scaled based on the number of controls in different policies for which evidence is used to determine whether the controls meet requirements of the policies;
   learning, by the number of machine learning models in the computer system, rules for mining evidence for the set of evidence requirements for the controls using the labeled historical evidence; and
   mining, by the number of machine learning models at the same time, the evidence for the set of evidence requirements for the controls according to the rules learned for mining the evidence.

10. The evidence mining system of claim 9, wherein the computer system generates a report for an audit using the evidence for the set of evidence requirements for the controls in which the evidence is mined using the rules learned for mining the evidence.

11. The evidence mining system of claim 9, wherein the mining is performed by at least one of a mining process in the computer system using the rules learned for mining the evidence or the number of machine learning models in the computer system in which the number of machine learning models was trained using the labeled historical evidence.

12. The evidence mining system of claim 9, wherein the computer system mines the evidence for another set of evidence requirements for another control that enforces another policy in the computer system that has a same set of evidence requirements using the rules learned for mining evidence for the set of evidence requirements for the controls.

13. The evidence mining system of claim 9, wherein in learning, by the number of machine learning models in the computer system, rules for mining the evidence for the set of evidence requirements for the controls using the labeled historical evidence, the number of machine learning models in the computer system learns rules for mining the evidence for the set of evidence requirements for the controls using the labeled historical evidence and a number of full data sets from a number of historical audits.

14. The evidence mining system of claim 9, wherein learning, by the number of machine learning models in the computer system, rules for mining the evidence for the set of evidence requirements for the controls using the labeled historical evidence comprises the number of machine learning models in the computer system learning the rules for mining the evidence for the set of evidence requirements for the controls using the labeled historical evidence and other labeled historical evidence for another set of evidence requirements for another control that has a same set of evidence requirements for the controls.

15. The evidence mining system of claim 9, wherein the labels are identified by at least one of a user input or a natural language processing technique.

16. A computer program product for collecting evidence, the computer program product comprising:
   a computer-readable storage media;
   first program code, stored on the computer-readable storage media, for identifying a set of evidence requirements for a number of controls that manage a set of resources in a computer system to enforce a policy in the computer system;
   second program code, stored on the computer-readable storage media, for associating labels with historical evidence for the set of evidence requirements, wherein the historical evidence comprises prior evidence collected for compliance with the set of evidence requirements for the controls and was accepted to meet the set of evidence requirements for the controls, wherein the labels represent requirements of the policy, and wherein the historical evidence with the labels form labeled historical evidence;
   third program code, stored on the computer-readable storage media, for mapping the labels to the controls based on the evidence requirements for the controls generating a number of machine learning models in the computer system, wherein the number of machine learning models are scaled based on number of controls in different policies;
   fourth program code, stored on the computer-readable storage media, for mapping standards to the controls according to relationships between controls in different standards that have the same requirements;
   fifth program code, stored on the computer-readable storage media, for learning, by the number of machine learning models, rules for mining evidence for the set of evidence requirements for the controls using the labeled historical evidence; and
   sixth program code, stored on the computer-readable storage media, for mining, by the number of machine learning models at the same time, the evidence for the set of evidence requirements for the controls according to the rules learned for mining the evidence.

17. The computer program product of claim 16 further comprising:
   seventh program code, stored on the computer-readable storage media, for generating a report for an audit using the evidence for the set of evidence requirements for the controls in which the evidence is mined using the rules learned for mining the evidence.

18. The computer program product of claim 16, wherein learning, by the number of machine learning models of the fourth program code, rules for mining the evidence for the set of evidence requirements for the control using the labeled historical evidence comprises:
   learning, by the number of machine learning models of the fifth program code, rules for mining the evidence for the set of evidence requirements for the controls using the labeled historical evidence and a number of full data sets from a number of historical audits.

19. The computer program product of claim 16, wherein learning, by the number of machine learning models of the fifth program code, rules for mining the evidence for the set of evidence requirements for the control using the labeled historical evidence comprises:
   learning, by the number of machine learning models of the fifth program code, the rules for mining the evidence for the set of evidence requirements for the controls using the labeled historical evidence and other labeled historical evidence for another set of evidence requirements for another control that has a same set of evidence requirements for the controls.

20. The computer program product of claim 16, wherein the labels are identified by at least one of a user input or a natural language processing technique.

\* \* \* \* \*